United States Patent [19]

Hirakawa

[11] Patent Number: 4,836,663

[45] Date of Patent: Jun. 6, 1989

[54] TELEPHOTO ZOOM LENS SYSTEM

[75] Inventor: Jun Hirakawa, Tokyo, Japan

[73] Assignee: Asahi Kogaku Kogyo Kabushiki Kaisha, Tokyo, Japan

[21] Appl. No.: 247,145

[22] Filed: Sep. 21, 1988

[30] Foreign Application Priority Data

Sep. 21, 1987 [JP] Japan .............................. 62-236689

[51] Int. Cl.$^4$ ......................... G02B 15/14; G02B 9/64
[52] U.S. Cl. .................................... 350/427; 350/450
[58] Field of Search .............................. 350/427, 450

[56] References Cited

FOREIGN PATENT DOCUMENTS 0095212 8/1981 Japan .
0049908 3/1983 Japan .
0066908 4/1983 Japan .
0079319 5/1985 Japan .
0133916 6/1986 Japan .

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A telephoto zoom lens system of a four-group composition that is capable of producing a high zoom ratio without increasing the complexity of a diaphragm stop mechanism and which yet is made compact in structure without sacrificing performance. The telephoto zoom lens system is composed, in order from the object side, of a first lens group having a positive refractive power, a second lens group having a negative refractive power, a third lens group having a positive refractive power together with a diaphragm stop provided for adjusting the quantity of light admitted, and a fourth lens group having a positive refractive power which consists of lens unit IVA having a positive refractive power and lens unit IVB having a negative refractive power. This lens system performs zooming by moving the first, second and fourth lens groups along the optical axis with the third lens group being fixed and performs focusing by moving the first lens group along the optical axis.

4 Claims, 6 Drawing Sheets

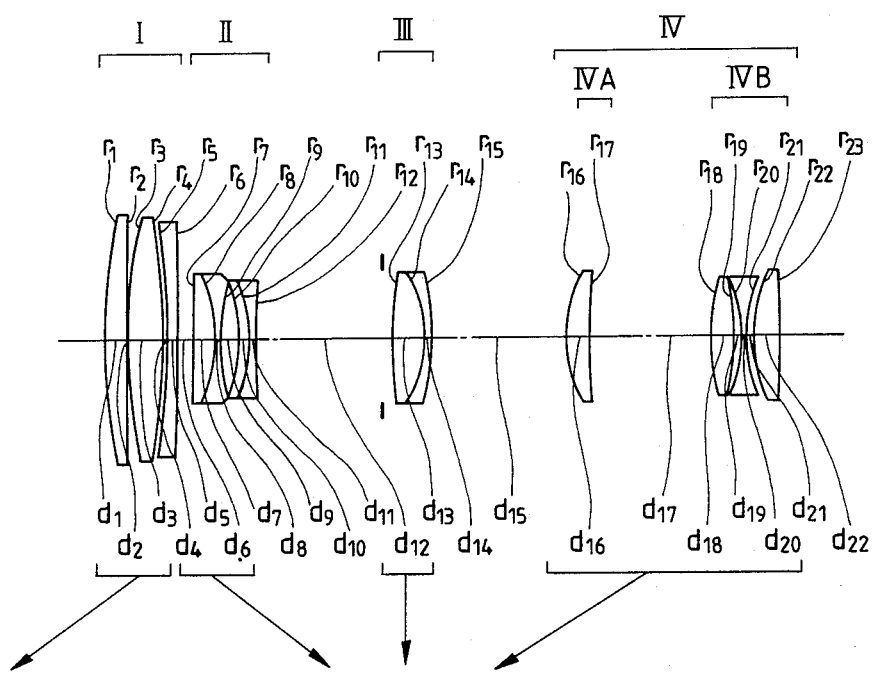
FIG. 1
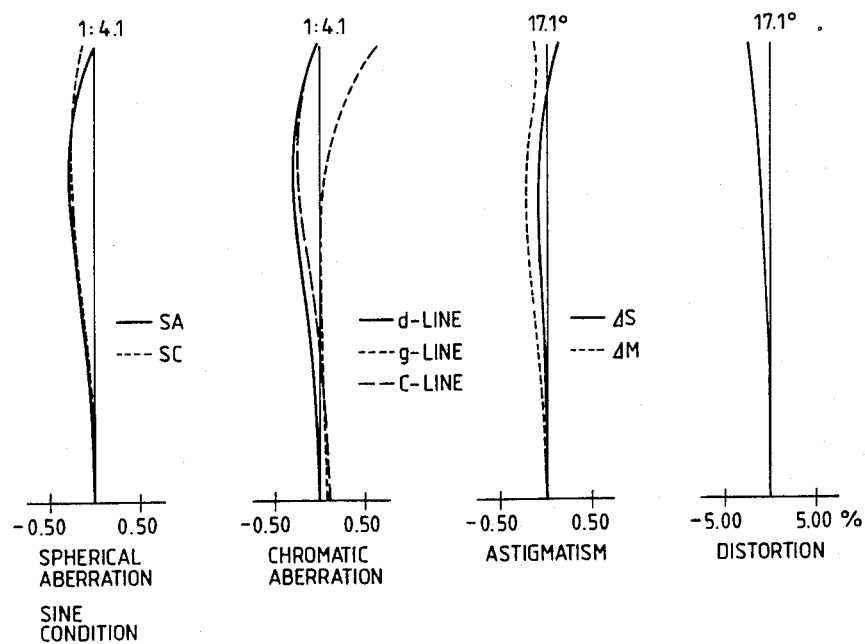
FIG. 2A  f = 72.16

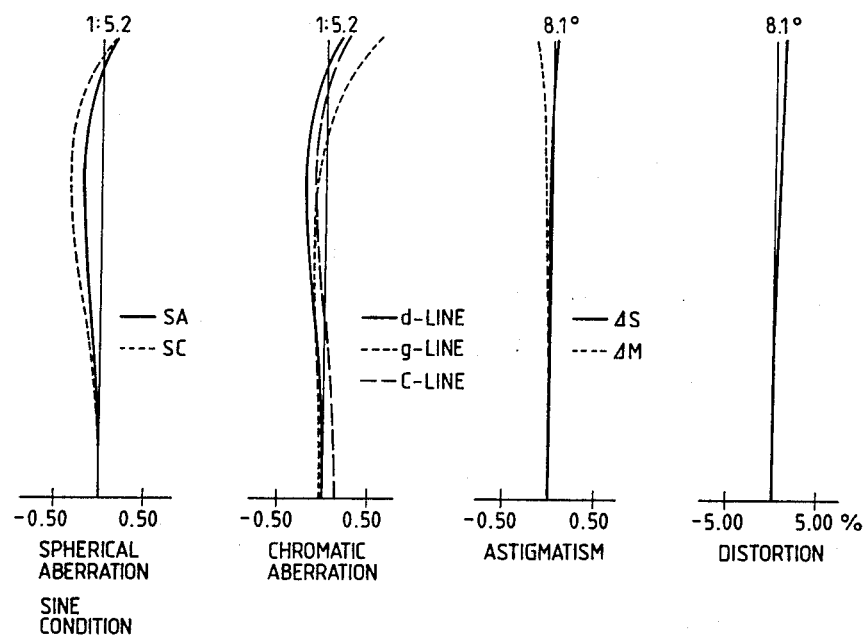
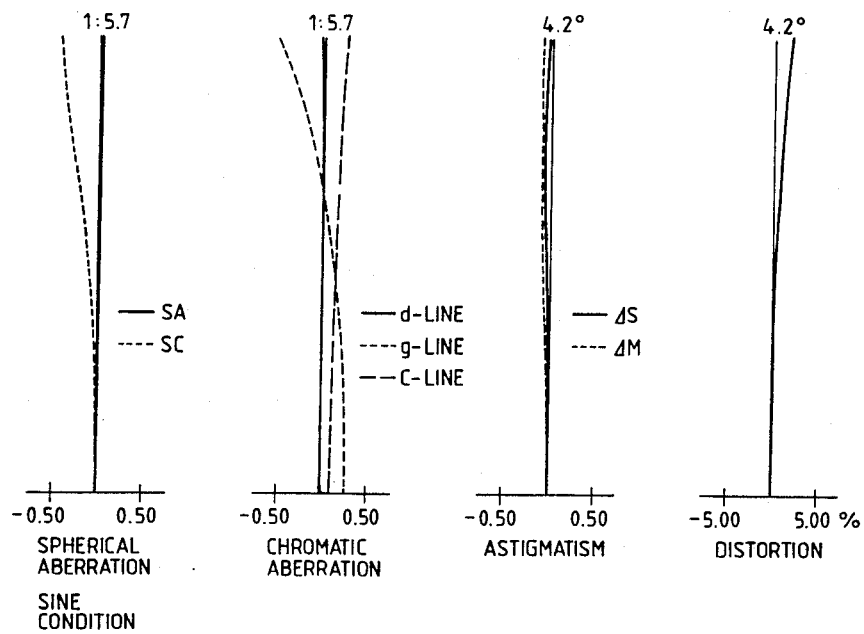

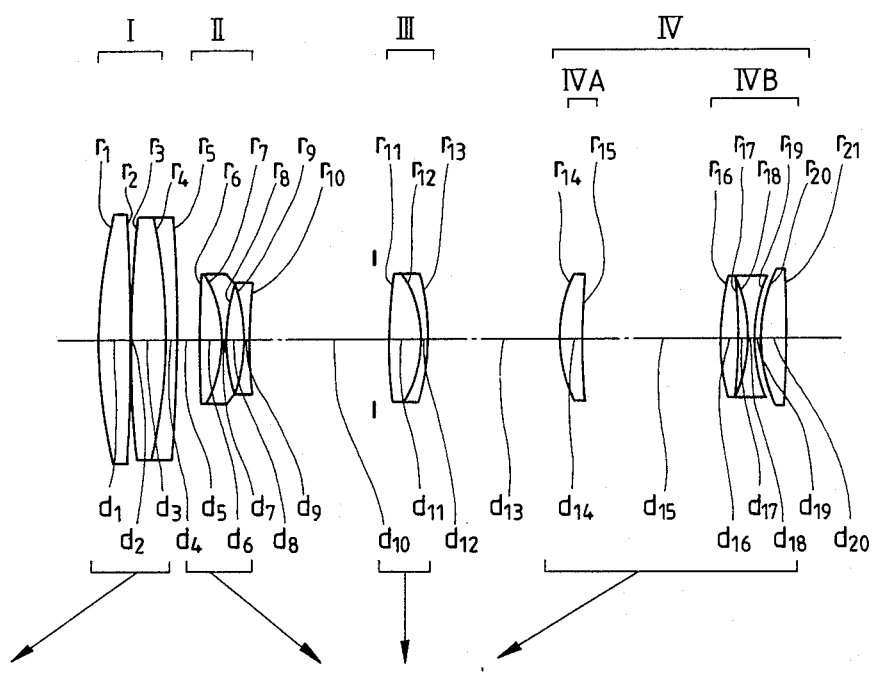
FIG. 3
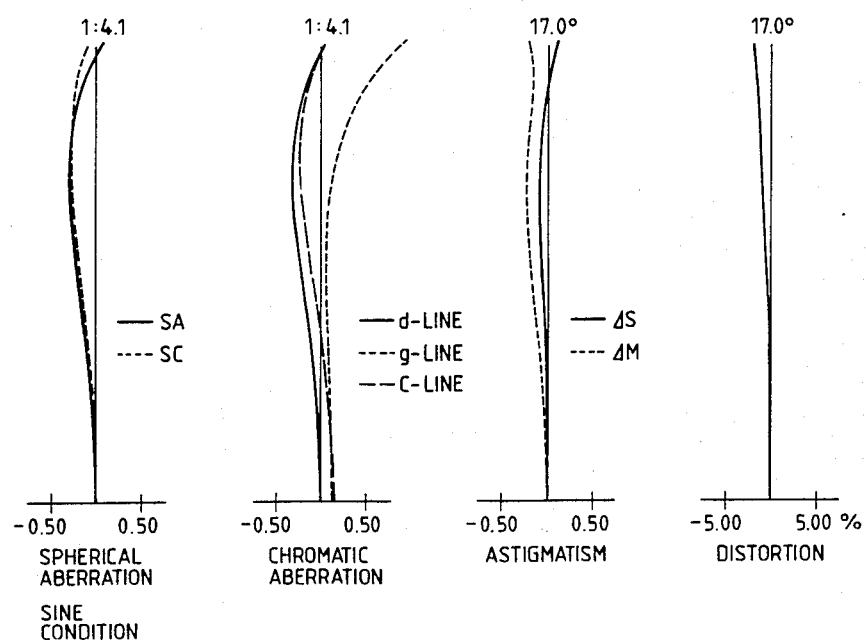
FIG. 4A   f = 72.17

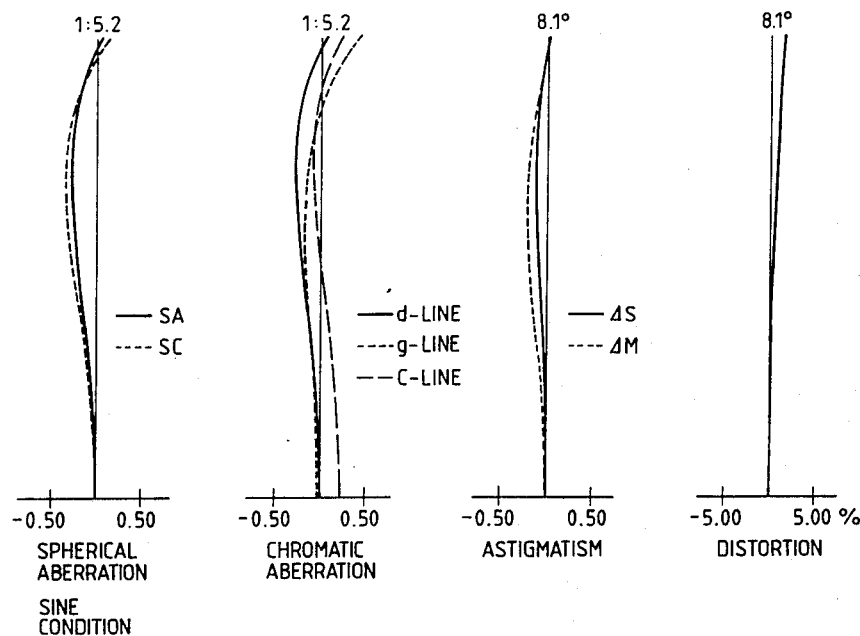
FIG. 4B  f = 150
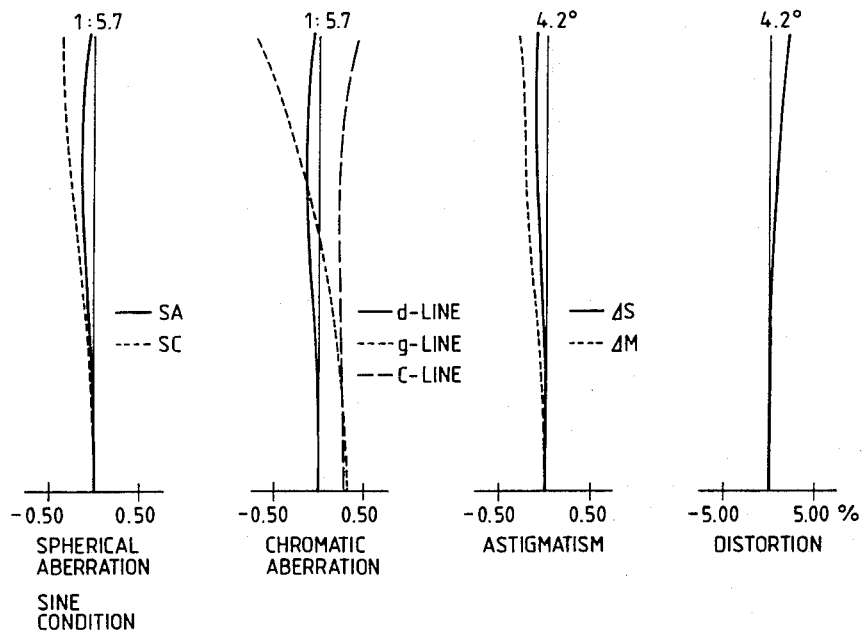
FIG. 4C  f = 290

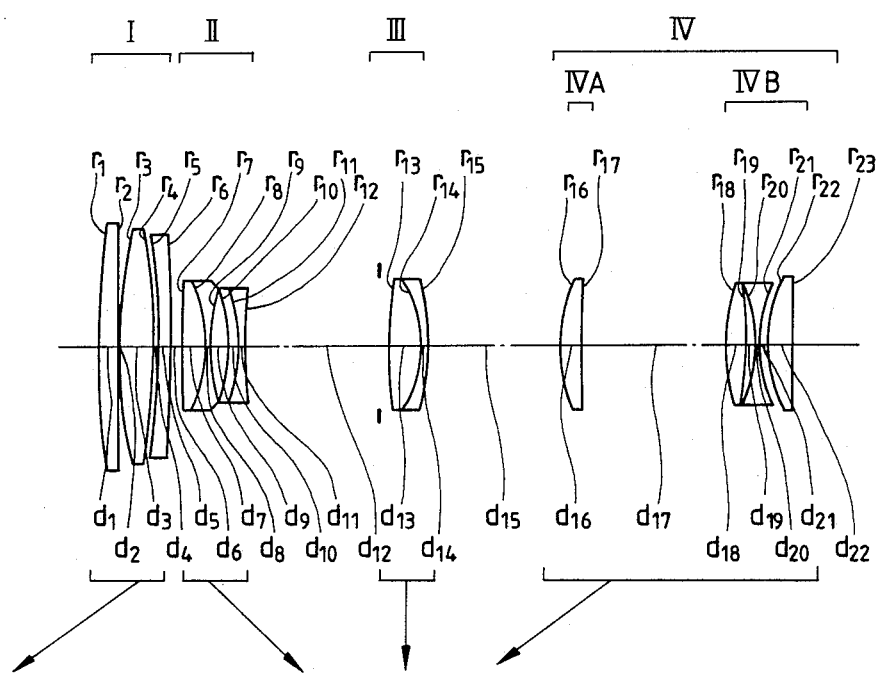
FIG. 5
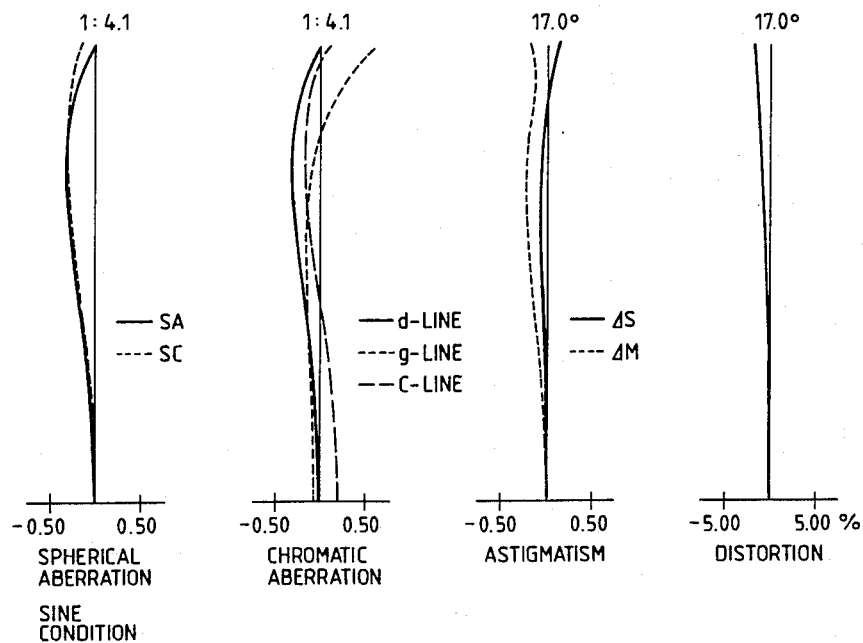
FIG. 6A    f=72.17

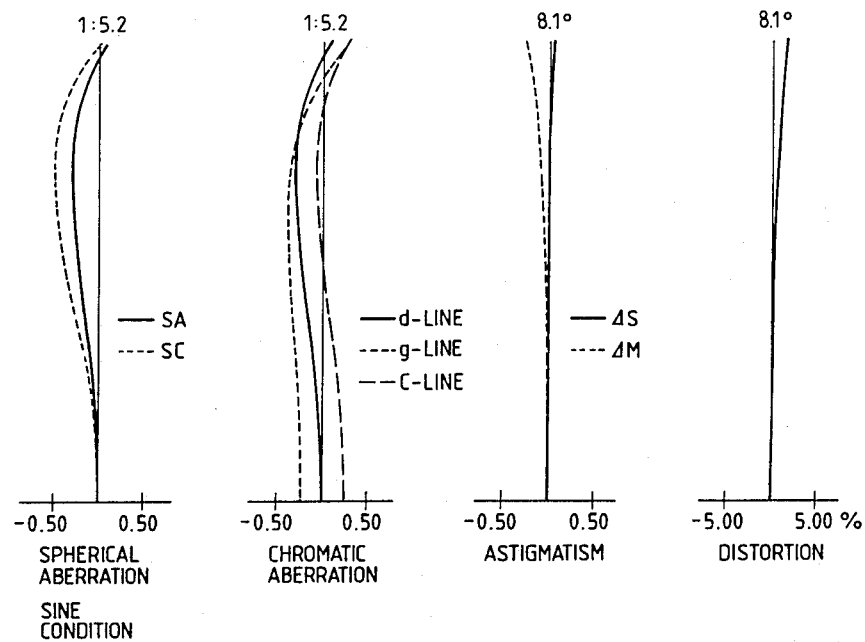
FIG. 6B  f=150
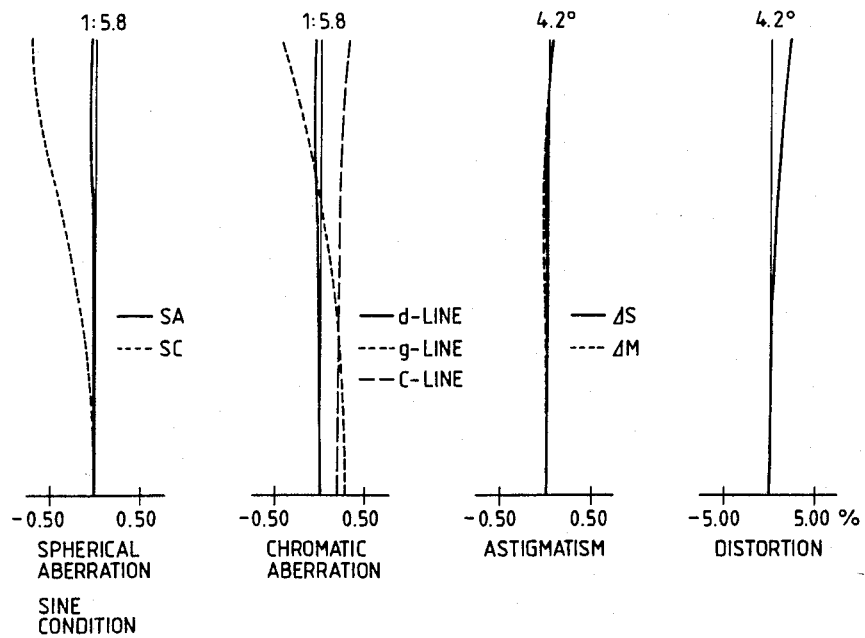
FIG. 6C  f=290

TELEPHOTO ZOOM LENS SYSTEM

BACKGROUND OF THE INVENTION

The present invention relates to a photographic zoom lens system. More particularly, the present invention relates to a telephoto zoom lens system of a four-group composition that is simple and compact in structure and which yet achieves good performance with a zoom ratio of about 4.

A telephoto zoom lens system that is composed, in order from the object side, of a positive, negative, positive and positive lens group (a total of four lens groups) and which provides a high zoom ratio by moving all lens groups is described in prior patents including Japanese Unexamined Published Patent Application Nos. 78319/1985 and 133916/1986. This type of lens system has the advantage that it is capable of providing a large zoom ratio as compared with a zoom lens system of the so-called "four-group" type which performs zooming with the negative second lens group and the positive third lens group being moved as a variator and a compensator, respectively. However, in the lens system that performs zooming by moving all lens groups it is also required to move a diaphragm stop during zooming, and this causes a disadvantage in that the diaphragm stop mechanism becomes complicated.

On the other hand, the diaphragm stop mechanism does not become complicated if the fourth lens group is fixed. However, in this type of zoom lens system, the diaphragm stop is situated in the rear part (i.e., fourth lens group) of the lens system and the purpose of improving the lens performance and ensuring sufficient marginal light when the system is stopped down cannot be attained unless the diameter of the front lens is increased.

SUMMARY OF THE INVENTION

The present invention has been accomplished in order to solve the aforementioned problems of the prior art. The principal object of the present invention is to provide a telephoto zoom lens system of a four-group composition that is capable of producing a high zoom ratio without increasing the complexity of a diaphragm stop mechanism and which yet is made compact in structure without sacrificing performance.

This and other objects of the present invention can be attained by a telephoto zoom lens system that is composed, in order from the object side, of a first lens group having a positive refractive power, a second lens group having a negative refractive power, a third lens group having a positive refractive power together with a diaphragm stop provided for adjusting the quantity of light, and a fourth lens group having a positive refractive power which consists of lens unit IVA having a positive refractive power and lens unit IVB having a negative refractive power. This lens system performs zooming by moving the first, second and fourth lens groups along the optical axis with the third lens group being fixed and performs focusing by moving the first lens group along the optical axis. Besides these features, the lens system of the present invention is characterized by satisfying the following conditions:

$$1.3 < |\Delta D_{(I-II)}/f_{II}| < 3.0, f_{II} < 0 \quad (1)$$

$$0.1 < \Delta D_{(III-IV)}/f_{IV} < 0.5 \quad (2)$$

$$0.5 < f_{IVA}/f_{IV} < 0.8. \quad (3)$$

While the objective of the present invention can be attained by incorporating the structural features described above, a preferred embodiment is arranged such that the lens unit IVA in the fourth lens group is composed of a single positive lens having a strong convex surface directed toward the object side and satisfies the following condition:

$$\nu_{IVA} > 60. \quad (4)$$

In another preferred embodiment, the lens unit IVB in the fourth lens group is composed, in order from the object side, of a positive lens having a strong convex surface directed toward the object side, a biconcave negative lens and a positive lens having a strong convex surface directed toward the object side, and satisfies the following conditions:

$$N_{IVBn} > 1.75 \quad (5)$$

$$\nu_{IVBp} < 50 \quad (6)$$

In still another preferred embodiment, the first and fourth lens groups are movable en masse during zooming.

The symbols used in conditions (1) to (6) have the following definitions:

$\Delta D_{(I-II)}$: the change in the distance between the first and second lens group during zooming, $f_{II}$: the focal length of the second lens group, $\Delta D_{(III-IV)}$: the change in the distance between the third and fourth lens groups during zooming, $f_{IV}$: the focal length of the fourth lens group, $f_{IVA}$: the focal length of the lens unit IVA, $\nu_{IVA}$: the Abbé number of the single positive lens of which the lens unit IVA is constructed, $N_{IVBn}$: the refractive index at the d-line of the negative lens in the lens unit IVB, and $\nu_{IVBp}$: the Abbé number of each of the positive lenses in the lens unit IVB.

The zoom lens system of the present invention attains a high zoom ratio by moving the first and second lens groups during zooming. In addition, the fourth lens group is also moved, and this plays the role of a compensator while attaining a zooming effect.

Since the third lens group having a diaphragm stop is fixed, the lens system of the present invention has the advantage that the mechanism of the diaphragm stop does not become complicated. At the same time, this arrangement is highly beneficial to the purpose of ensuring high lens performance and effective passage of marginal light when the diaphragm is stopped down, as compared with the case where the diaphragm stop is disposed in the fourth lens group.

The conditions to be satisfied by the zoom lens system of the present invention are described hereinafter.

Condition (1) sets forth the ratio of the change in the distance between the first and second lens groups during zooming (i.e., the change in the distance from the object to the second lens group) to the focal length of the second lens group. This condition needs to be satisfied in order to attain a high zoom ratio. If $\Delta D_{(I-II)}$ decreases to such a level that the lower limit of condition (1) is not reached or if $f_{II}$ becomes too great to attain the necessary power of the second lens group, a desired large zoom ratio is not attainable. If $\Delta D_{(I-II)}$ is increased to such a level that the upper limit of condition (1) is exceeded, the purpose of realizing a compact overall system is not attained. If $f_{II}$ is unduly small, undesirably great aberrational variations will occur in zooming.

Condition (2) sets forth the ratio of the change in the distance between the third and fourth lens groups during zooming to the focal length of the fourth lens group. In other words, this condition indicates the range over which the fourth lens group can be moved relative to the fixed third lens group and the necessary back focus. If the range over which the fourth lens group can be moved is set to an unduly great value (i.e., if the upper limit of condition (2) is exceeded), the size of the overall lens system is increased, which is against the purpose of realizing a compact system. If the range over which the fourth lens can be moved is too narrow or if the focal distance of the fourth lens group is made too long (i.e., if the lower limit of condition (2) is not reached), satisfactory compensation for the focus position cannot be accomplished without relying upon the first and second lens groups. In order to compensate for the focus position by means of the first and second lens groups, the distance over which these lens groups are moved has to be increased, but then such goes against the objective of realizing a compact system.

Condition (3) relates to the power distribution in the fourth lens group that is necessary for providing it with a compact telephoto composition. If this condition is satisfied, it becomes easier to ensure $\Delta D_{(III-IV)}$ in condition (2), thereby contributing to the realization of a compact overall system. If the power distribution in the fourth lens group becomes unbalanced in such a way that the lower limit of condition (3) is not reached, increased chromatic aberration will occur in the lens unit IVA. In addition, it becomes necessary to increase the negative power of the lens unit IVB, and the resulting decrease in the Petzval sum leads to an increased chance of occurrence of field curvature. If the upper limit of condition (3) is exceeded, the fourth lens group cannot be made compact and at attempt to ensure $\Delta D_{(III-IV)}$ in condition (2) will result in an undesirable increase in the size of the overall lens system.

Conditions (4) to (6) are those which should be satisfied by the fourth lens group in order to provide even better performance for the zoom lens system of the present invention which already satisfies conditions (1) to (3).

Condition (4) refers to the Abbé number of the lens unit IVA in the fourth lens group which is necessary to achieve satisfactory compensation for chromatic aberration even if the lens unit IVA is made of a single lens. The lens unit IVA has a positive power in the fourth lens group and contributes to the realization of a compact overall system as indicated by condition (3). Desirably, any chromatic aberration that develops in the lens unit IVA is satisfactorily compensated with respect to the lens unit IVB. It might be possible for this requirement to be met by forming the lens unit IVA with two achromatic lenses but, more preferably, the lens unit IVA is composed of a single positive lens that is made from an optical material having a large Abbé number. Condition (4) must be satisfied in order to compose the lens unit IVA of a single positive lens and yet to provide it with satisfactory performance. If the lower limit of this condition is not reached, great chromatic aberration will occur and it becomes difficult to compose the lens unit IVA of a single lens. By employing an optical material that satisfies condition (4), the lens unit IVA can be composed of a single positive lens having a strong convex surface directed toward the object side.

Conditions (5) and (6) set forth the range of optical materials that are to be employed to form the lens unit IVB of the fourth lens group. As indicated by condition (3), the fourth lens group is of the telephoto type and the lens unit IVB has a strong negative power. A problem associated with this strong negative power is that the flatness of the image plane is impaired by the decrease in the Petzval sum, which increases the chances that chromatic aberration will occur. In order to avoid this problem, the negative lens in the lens unit IVB must be made of an optical material having a high refractive index so as to keep the Petzval sum at an appropriate level. It is also necessary for the positive lenses in the unit IVB to be made of an optical material having a sufficiently small Abbé number to effectively compensate for the chromatic aberration that might occur in the negative lens. By composing the lens unit IVB of and optical material that satisfies both conditions (5) and (6), effective compensation for field curvature and chromatic aberration can be achieved. If these conditions are not met, it becomes difficult to ensure satisfactory aberrational compensation over the full zooming range.

In the present invention, the first and fourth lens groups are desirably moved en masse during zooming because, if these two lens groups are adapted to be moved in unison during zooming with the third lens group being fixed, the composition of the lens barrel can be greatly simplified in that only a cam mechanism needs to be provided for the second lens group.

BRIEF DESCRIPTION OF THE DRAWINGS

FIGS. 1, 3 and 5 are simplified cross-sectional views of the zoom lens systems at the wide angle position of Examples 1, 2 and 3, respectively, of the present invention, with the movement of individual lens groups during zooming being also shown;

FIGS. 2A, 4A and 6A are graphs showing the aberration curves obtained at the wide angle position of the zoom lens systems constructed according to Examples 1, 2 and 3, respectively;

FIGS. 2B, 4B and 6B are graphs showing the aberration curves obtained at the middle angle position of the zoom lens systems constructed according to Examples 1, 2 and 3, respectively; and FIGS. 2C, 4C and 6C are graphs showing the aberration curves obtained at the narrow angle position of the zoom lens systems constructed according to Examples 1, 2 and 3, respectively.

DESCRIPTION OF THE PREFERRED EMBODIMENTS

Three examples of the present invention are described below with reference to the accompanying drawings, which show simplified cross-sectional views of the zoom lens systems fabricated in these examples, as well as graphs showing the aberration curves obtained with these lens systems. The zoom lens systems of the present invention employ a simple composition and moving method (zooming method), and yet they achieve satisfactory performance with zoom ratios of about 4. The symbols used in the data sheets given in Examples 1 to 3 have the following meanings: $F_{NO}$, aperture ratio; f, focal length, ω, half viewing angle; $f_B$, back focus; r, the curvature radius of an individual lens surface; d, the distance between lens surfaces; N, the refractive index at the d-line of individual lens; and $\nu$, the Abbé number of an individual lens.

EXAMPLE 1

$F_{NO}=1:4.1\sim5.2\sim5.7$
$f=72.16\sim150.00\sim290.00$
$\omega=17.1°\sim8.1°\sim4.2°$
$f_B=53.08\sim72.29\sim81.64$

| Surface No. | r | d | N | $\nu$ |
|---|---|---|---|---|
| 1 | 137.270 | 4.90 | 1.48749 | 70.2 |
| 2 | ∞ | 0.10 | | |
| 3 | 110.720 | 7.93 | 1.49700 | 81.6 |
| 4 | −152.239 | 0.98 | | |
| 5 | −164.790 | 2.50 | 1.80518 | 25.4 |
| 6 | −1169.882 | 3.35~35.36~58.71 | | |
| 7 | 533.000 | 4.83 | 1.80518 | 25.4 |
| 8 | −35.500 | 1.50 | 1.69680 | 55.5 |
| 9 | 49.900 | 3.45 | | |
| 10 | −43.195 | 2.66 | 1.71736 | 29.5 |
| 11 | −30.186 | 1.50 | 1.77250 | 49.6 |
| 12 | 212.500 | 29.81~17.00~3.00 | | |
| 13 | 94.430 | 6.97 | 1.58913 | 61.2 |
| 14 | −27.020 | 1.50 | 1.80518 | 25.4 |
| 15 | −55.210 | 30.06~10.85~1.50 | | |
| 16 | 30.400 | 4.93 | 1.49700 | 81.6 |
| 17 | 166.610 | 26.61 | | |
| 18 | 47.790 | 4.30 | 1.59270 | 35.3 |
| 19 | −96.900 | 1.89 | | |
| 20 | −31.885 | 1.50 | 1.83400 | 37.2 |
| 21 | 31.885 | 1.86 | | |
| 22 | 36.250 | 5.25 | 1.67270 | 32.1 |
| 23 | −261.584 | | | |

$\Delta D_{(I-II)}/f_{II}=-1.783$
$\Delta D_{(III-IV)}/f_{IV}=0.256$
$f_{IVA}/f_{IV}=0.662$

EXAMPLE 2

$F_{NO}=1:4.1\sim5.2\sim5.7$
$f=72.17\sim150.00\sim290.00$
$\omega=17.0°\sim8.1°\sim4.2°$
$f_B=47.00\sim65.90\sim74.60$

| Surface No. | r | d | N | $\nu$ |
|---|---|---|---|---|
| 1 | 107.246 | 7.13 | 1.48749 | 70.2 |
| 2 | −492.643 | 0.10 | | |
| 3 | 213.240 | 7.80 | 1.48749 | 70.2 |
| 4 | −117.139 | 2.50 | 1.80518 | 25.4 |
| 5 | −376.476 | 5.00~36.83~59.83 | | |
| 6 | 292.030 | 4.83 | 1.80518 | 25.4 |
| 7 | −31.295 | 1.50 | 1.69680 | 55.5 |
| 8 | 49.405 | 3.45 | | |
| 9 | −39.756 | 1.50 | 1.77250 | 49.6 |
| 10 | 153.755 | 30.38~17.45~3.15 | | |
| 11 | 87.646 | 6.97 | 1.58913 | 61.2 |
| 12 | −25.540 | 1.50 | 1.80518 | 25.4 |
| 13 | −51.674 | 29.10~10.20~1.50 | | |
| 14 | 32.616 | 4.93 | 1.48749 | 70.2 |
| 15 | 176.720 | 30.92 | | |
| 16 | 52.011 | 4.28 | 1.59270 | 35.3 |
| 17 | −88.688 | 1.76 | | |
| 18 | −32.072 | 1.50 | 1.83400 | 37.2 |
| 19 | 35.865 | 1.76 | | |
| 20 | 39.037 | 5.28 | 1.67270 | 32.1 |
| 21 | −230.058 | | | |

$\Delta D_{(I-II)}/f_{II}=-1.789$
$\Delta D_{(III-IV)}/f_{IV}=0.230$
$f_{IVA}/f_{IV}=0.610$

EXAMPLE 3

$F_{NO}=1:4.1\sim5.2\sim5.8$
$f=72.17\sim150.00\sim290.00$
$\omega=17.0°\sim8.1°\sim4.2°$
$f_B=46.88\sim65.66\sim74.45$

| Surface No. | r | d | N | $\nu$ |
|---|---|---|---|---|
| 1 | 150.791 | 4.90 | 1.48749 | 70.2 |
| 2 | ∞ | 0.10 | | |
| 3 | 108.030 | 7.93 | 1.49700 | 81.6 |
| 4 | −140.383 | 0.98 | | |
| 5 | −149.093 | 2.50 | 1.80518 | 25.4 |
| 6 | −705.598 | 3.00~35.08~58.63 | | |
| 7 | 491.235 | 4.83 | 1.80518 | 25.4 |
| 8 | −35.704 | 1.50 | 1.69680 | 55.5 |
| 9 | 50.638 | 3.45 | | |
| 10 | −44.613 | 2.66 | 1.71736 | 29.5 |
| 11 | −32.826 | 1.50 | 1.77250 | 49.6 |
| 12 | 194.756 | 31.06~17.76~3.00 | | |
| 13 | 82.598 | 6.97 | 1.58913 | 61.2 |
| 14 | −27.135 | 1.50 | 1.80518 | 25.4 |
| 15 | −58.329 | 29.07~10.29~1.50 | | |
| 16 | 36.264 | 4.48 | 1.51633 | 64.1 |
| 17 | 332.029 | 31.85 | | |
| 18 | 47.892 | 4.30 | 1.57845 | 41.5 |
| 19 | −97.482 | 1.64 | | |
| 20 | −34.935 | 1.50 | 1.78590 | 44.2 |
| 21 | 30.574 | 1.74 | | |
| 22 | 33.154 | 5.18 | 1.60342 | 38.0 |
| 23 | 1524.199 | | | |

$\Delta D_{(I-II)}/f_{II}=-1.753$
$\Delta D_{(III-IV)}/f_{IV}=0.2315$
$f_{IVA}/f_{IV}=0.659$

I claim:

1. A telephoto zoom lens system comprising, in order from the object side, a first lens group I having a positive refractive power, a second lens group II having a negative refractive power, a third lens group III having a positive refractive power together with a diaphragm stop provided for adjusting the quantity of light, and a fourth lens group IV having a positive refractive power which consists of lens unit IVA having a positive refractive power and lens unit IVB having a negative refractive power, said lens system performing zooming by moving the first, second and fourth lens groups along the optical axis, with the third lens group bring fixed, and performing focusing by moving the first lens group along the optical axis, said lens system being further characterized by satisfying the following conditions:

$$1.3<|\Delta D_{(I-II)}/f_{II}|<3.0, f_{II}<0 \quad (1)$$

$$0.1<\Delta D_{(III-IV)}/f_{IV}<0.5 \quad (2)$$

$$0.5<f_{IVA}/f_{IV}<0.8 \quad (3)$$

where $\Delta D_{(I-II)}$: change in the distance between the first and second lens groups during zooming, $f_{II}$: focal length of the second lens group, $\Delta D_{(III-IV)}$: change in the distance between the third and fourth lens groups during zooming, $f_{IV}$: focal length of the fourth lens group, and $f_{IVA}$: focal length of the lens unit IVA.

2. The telephoto zoom lens system according to claim 1, wherein the lens unit IVA in the fourth lens group consists of a single positive lens having a strong convex surface directed toward the object side and which satisfies the following condition:

$$\nu_{IVA}>60 \quad (4)$$

where $\nu_{IVA}$: Abbé number of the single positive lens of the lens unit IVA.

3. The telephoto zoom lens system according to claim 1, wherein the lens unit IVB in the fourth lens group comprises, in order from the object side, a positive lens having a strong convex surface directed toward the object side, a biconcave negative lens, and a positive lens having a strong convex surface directed toward the object side, and which satisfies the following conditions:

$$N_{IVBn} > 1.75 \tag{5}$$

$$\nu_{IVBp} < 50 \tag{6}$$

where
$N_{IVBn}$: refractive index at the d-line of the negative lens in the lens unit IVB, and
$\nu_{IVBp}$: Abbé number of each of the positive lenses in the lens unit IVB.

4. The telephoto zoom lens system according to claim 1, wherein the first and fourth lens groups are movable en masse during zooming.

* * * * *